(12) United States Patent
Liburd

(10) Patent No.: US 6,457,440 B1
(45) Date of Patent: Oct. 1, 2002

(54) PUBLIC HEALTH APPARATUS

(76) Inventor: Levi Liburd, 114-15 147th St., Jamaica, NY (US) 11436

( * ) Notice: Subject to any disclaimer, the term of this patent is extended or adjusted under 35 U.S.C. 154(b) by 0 days.

(21) Appl. No.: 09/949,173

(22) Filed: Sep. 7, 2001

Related U.S. Application Data

(60) Provisional application No. 60/232,109, filed on Sep. 11, 2000.

(51) Int. Cl.[7] .............................................. A01K 23/00
(52) U.S. Cl. ...................................................... 119/868
(58) Field of Search ................................ 119/868, 867; 604/395, 329, 322

(56) References Cited

U.S. PATENT DOCUMENTS

| | | | | |
|---|---|---|---|---|
| 133,007 A | * | 11/1872 | Berlinger | 119/868 |
| 337,181 A | * | 3/1886 | McDonough | 119/868 |
| 688,203 A | * | 12/1901 | Sellers | 119/868 |
| 718,915 A | * | 1/1903 | Cooper | 119/868 |
| 881,753 A | * | 3/1908 | Whitehouse | 119/868 |
| 900,783 A | * | 10/1908 | Roberts | 119/868 |
| 2,160,473 A | * | 5/1939 | Dunn | 119/868 |
| 4,709,661 A | | 12/1987 | Mayle, Jr. | |
| 5,315,960 A | * | 5/1994 | Lamp | 119/868 |
| 5,386,802 A | * | 2/1995 | Hang-Fu | 119/868 |
| 5,427,059 A | | 6/1995 | Logan | |
| 5,819,691 A | * | 10/1998 | Lavi et al. | 119/868 |
| 5,937,795 A | * | 8/1999 | Raphael | 119/868 |

* cited by examiner

*Primary Examiner*—Robert P. Swiatek
*Assistant Examiner*—Kevin Jakel
(74) *Attorney, Agent, or Firm*—Matthew J. Peirce

(57) ABSTRACT

A new and improved collection device is disclosed which would be attached to the rear of a horse in order to ensure that fecal matter emitted from the horse would be collected in the collection device and not all over a street or other ground surface. The collection device would comprise an inner bag and an outer bag, with the inner bag being emptied when full. The inner bag would be located inside the outer bag, with both the inner bag and the outer bag being placed over a horse's rear end in order to properly collect fecal matter emitted by the horse. Further, the outer bag would be connected to a rear strap, with the rear strap being connected to a series of other straps which would permit the present invention to be removably mounted onto a horse.

3 Claims, 2 Drawing Sheets

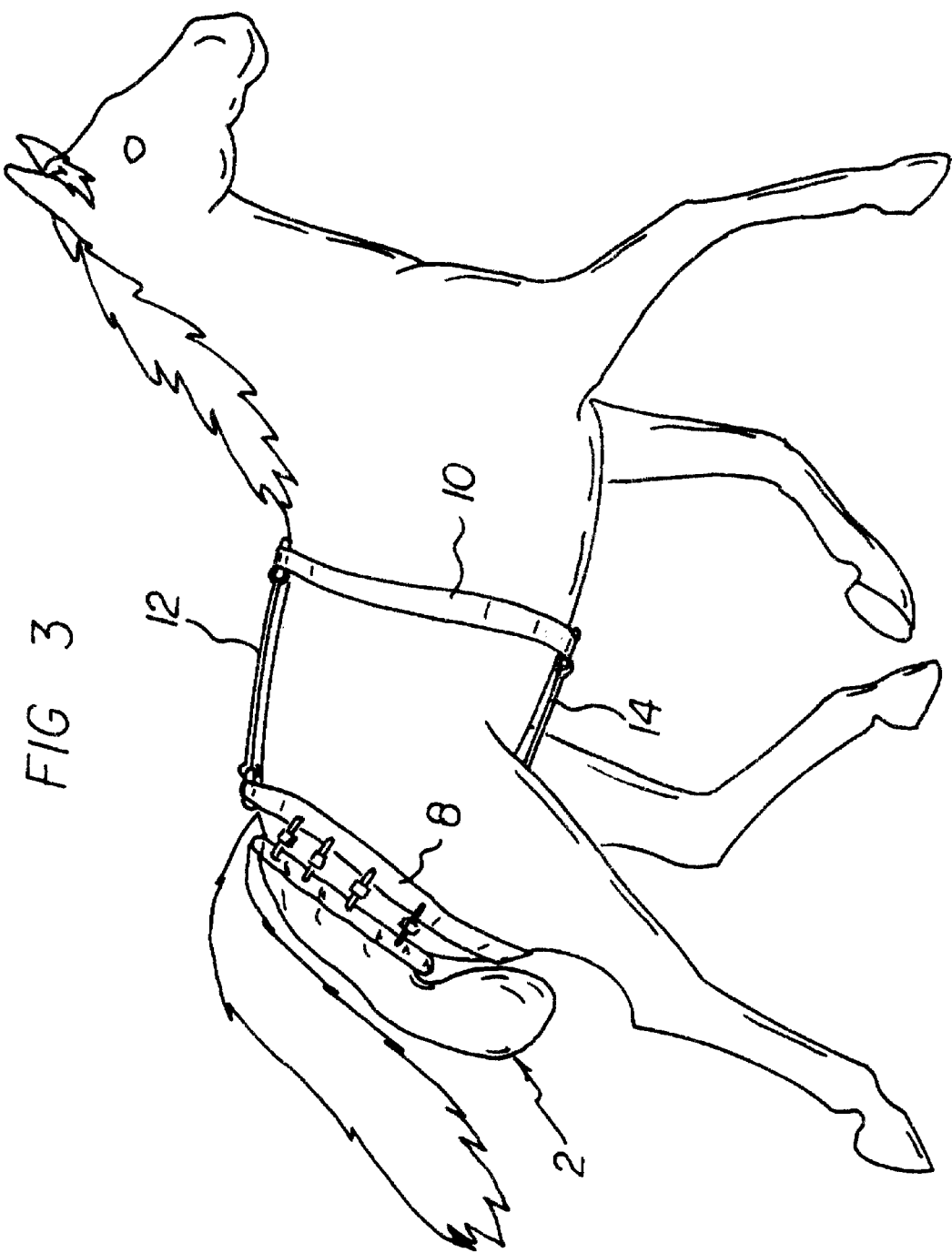

PUBLIC HEALTH APPARATUS

This application claims the benefit of provisional application No. 60/232,109 filed on Sep. 11, 2000.

I. BACKGROUND OF THE INVENTION

The present invention is that of a new and improved collection device which would be attached to the rear of a horse in order to ensure that fecal matter emitted from the horse would be collected in the collection device and not all over a street or other ground surface.

II. DESCRIPTION OF THE PRIOR ART

U.S. Pat. No. 5,427,059, issued to Logan, discloses an improved waste collecting device for dogs and like animals.

U.S. Pat. No. 4,709,661, issued to Mayle, Jr., discloses a waste bag for collecting solid waste excretions of a horse and comprises a bottom cup-like portion and a back portion extending upwardly from the rearward side of the bottom portion.

U.S. Pat. No. 133,007, issued to Berlinger, discloses a system and means for the prevention of animal excrementitious deposits in streets.

III. SUMMARY OF THE INVENTION

The present invention is that of a new and improved collection device which would be attached to the rear of a horse in order to ensure that fecal matter emitted from the horse would be collected in the collection device and not all over a street or other ground surface. The collection device would comprise an inner bag and an outer bag, with the inner bag being emptied when full. The inner bag would be located inside the outer bag, with both the inner bag and the outer bag being placed over a horse's rear end in order to properly collect fecal matter emitted by the horse. Further, the outer bag would be connected to a rear strap, with the rear strap being connected to a series of other straps which would permit the present invention to be removably mounted onto a horse.

There has thus been outlined, rather broadly, the more important features of an animal health apparatus in order that the detailed description thereof that follows may be better understood and in order that the present contribution to the art may be better appreciated. There are, of course, additional features of the animal health apparatus that will be described hereinafter and which will form the subject matter of the claims appended hereto.

In this respect, before explaining at least one embodiment of the animal health apparatus in detail, it is to be understood that the animal health apparatus is not limited in its application to the details of construction and to the arrangements of the components set forth in the following description or illustrated in the drawings. The animal health apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present animal health apparatus. It is important, therefore, that the claims be regard as including such equivalent constructions insofar as they do not depart from the spirit and scope of the present invention.

It is therefore an object of the present invention to provide a animal health apparatus which has all of the advantages of the prior art and none of the disadvantages.

It is another object of the present invention to provide an animal health apparatus which may be easily and efficiently manufactured and marketed.

It is another object of the present invention to provide an animal health apparatus which is of durable and reliable construction.

It is yet another object of the present invention to provide an animal health apparatus which is economically affordable and available to the buying public.

It is yet another object of the present invention to provide an animal health apparatus which provides additional benefits not present in the prior art.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 3 shows the present invention as it would appear in use on a horse.

V. DESCRIPTION OF THE PREFERRED EMBODIMENT

Figure 1:
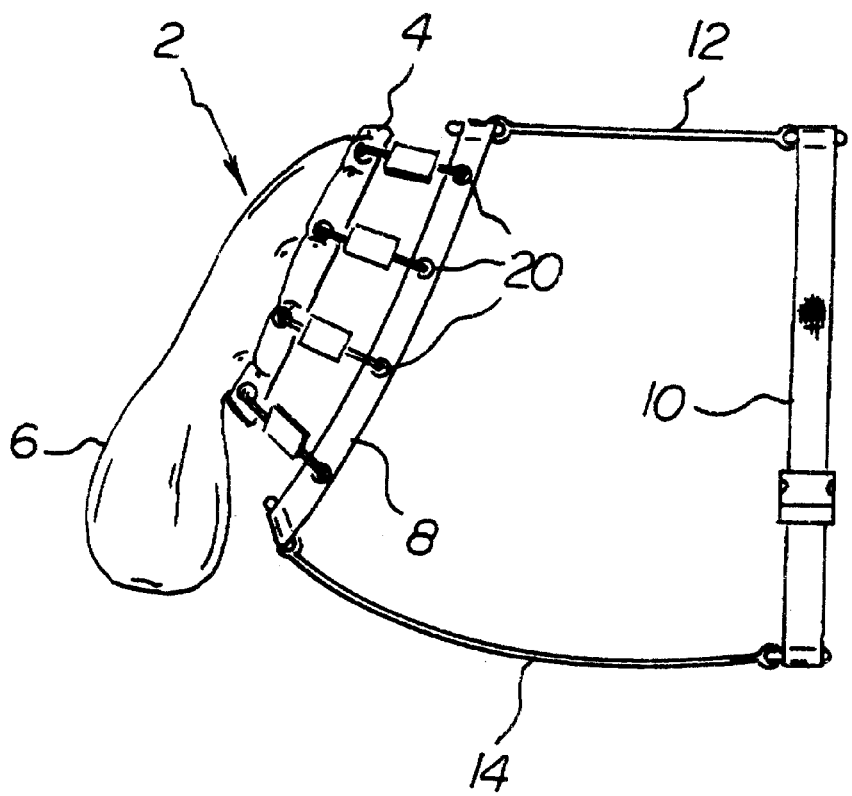
FIG. 1 shows a side view of the strap system of the present invention unattached to a horse.
Figure 2:
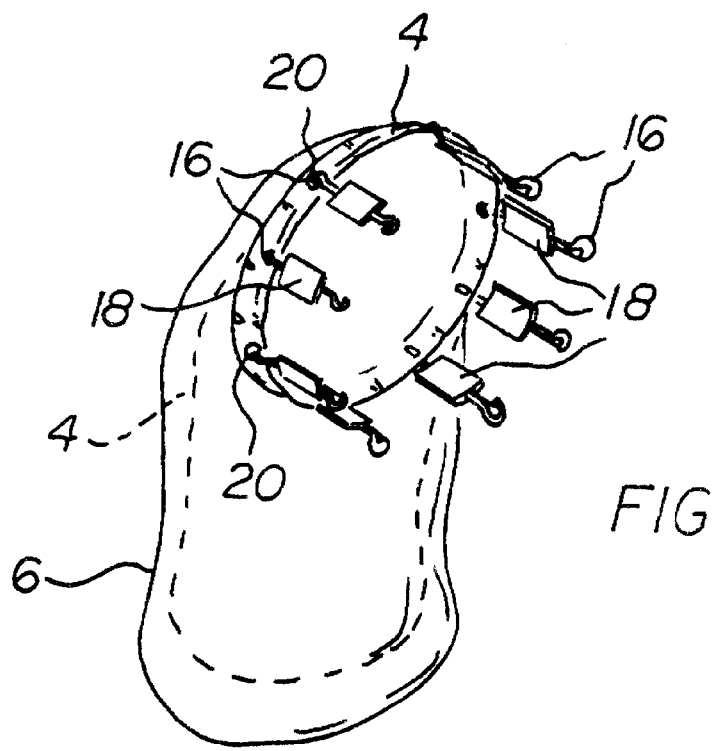
FIG. 2 shows a perspective view of the inner bag and outer bag of the present invention unattached to the strap system.

FIGS. 1 and 2 show a side view of the collection device of the present invention unattached to a horse. The present invention is that of a new and improved collection device 2 which would be attached to the rear of a horse in order to ensure that fecal matter emitted from the horse would be collected in the collection device 2 and would not be emitted all over a street or other ground surface. The collection device 2 would comprise an inner bag 4 and an outer bag 6, with the inner bag 4 being emptied when full and the outer bag 6 serving as an extra padded layer. The inner bag 4 would be located inside the outer bag 6, with both the inner bag 4 and the outer bag 6 being placed over a horse's rear end in order to properly collect fecal matter emitted by the horse. Further, the outer bag 6 would be connected to a rear strap 8, with the rear strap 8 being connected to a series of other straps which would permit the present invention to be removably mounted onto a horse.

FIG. 1 shows the strap configuration of the collection device 2. The strap configuration comprises a rear strap 8, a middle strap 10, a top strap 12, and a bottom strap 14. Rear strap 8 and middle strap 10 are circular, with middle strap 10 being designed to completely wrap around the midsection of the horse. Bottom strap 14 connects the bottom of rear strap 8 to the bottom of middle strap 10, while top strap 12 connects the top of rear strap 8 to the top of middle strap 10.

FIG. 2 shows a perspective view of the inner bag 4 and outer bag 6 of the present invention unattached to the strap system. The outer lip of both inner bag 4 and outer bag 6 would be attached to rear strap 8 at a plurality of locations by a plurality of hooks 16, with the hooks being located on both sides of a plurality of straps 18. Both the outer lip of inner bag 4 and outer bag 6 and rear strap 8 would have a plurality of eyelets 20 in which the hooks 16 on straps 18 could be attached, which would ensure that the outer bag 6 and inner bag 4 would remain in their proper places after they have been set up.

FIG. 3 shows the present invention as it would appear in use on a horse. When properly attached, the present invention would work effectively in ensuring that any horse fecal matter would wind up in the collection device 2 of the present invention and not on a street or other ground surface. Once the inner bag 4 would become fill, a user could remove inner bag 4, empty its contents, and properly replace inner bag 4 within collection device 2.

What I claim as my invention is:

1. An apparatus for collecting horse fecal matter in combination with a horse comprising:
   (a) an inner bag placed over the rear end of a horse, the inner bag having a continuous outer lip,
   (b) an outer bag placed over the rear end of a horse, the outer bag having a continuous outer lip, the outer bag being placed over the inner bag,
   (c) a rear strap, the rear strap being circular in shape, the rear strap being placed on a horse in such a manner to surround the rear end of a horse, the rear strap having a top point and a bottom point,
   (d) attachment means for connecting the rear strap to the outer lip of the inner bag and the outer lip of the outer bag,
   (e) a middle strap wrapped around the midsection of a horse, the middle strap being circular in shape, the middle strap having a top point and a bottom point, the middle strap being designed in a continuous circular shape,
   (f) a top strap having two ends, a first end and a second end, the first end of the top strap being connected to the top point of the rear strap, and the second end of the top strap being connected to the top point of the middle strap, and
   (g) a bottom strap having two ends, a first end and a second end, the first end of the bottom strap being connected to the bottom point of the rear strap, and the second end of the bottom strap being connected to the bottom point of the middle strap.

2. An apparatus for collecting horse fecal matter in combination with a horse according to claim 1 wherein the attachment means for connecting the rear strap to the outer lip of the inner bag and the outer lip of the outer bag further comprises:
   (a) a plurality of eyelets interspersed at even distances along the outer lip of the inner bag,
   (b) a plurality of eyelets interspersed at even distances along the outer lip of the outer bag,
   (c) a plurality of eyelets interspersed at even distances along the rear strap, and
   (d) a plurality of connectors, each connector having two ends, a first end and a second end, the first end of each connector being removably attached to an eyelet on the outer lip of the inner bag and an eyelet on the outer lip of the outer bag, the second end of each connector being removably attached to an eyelet on the rear strap.

3. An apparatus for collecting horse fecal matter in combination with a horse according to claim 1 wherein each connector further comprises:
   (a) a first hook having two ends, a hook end and a base end,
   (b) a rubber strap having two ends, a first end and a second end, the first end of the rubber strap being attached to the base end of the first hook, and
   (c) a second hook having two ends, a hook end and a base end, the base end of the second hook being attached to the second end of the rubber strap.

* * * * *